United States Patent Office 3,698,917
Patented Oct. 17, 1972

3,698,917
FREE FLOWING POWDER CONTAINING CONFECTIONERS' SUGAR
Wilhelm Baum and Michael Gierlichs, Dusseldorf, Germany, assignors to Henkel & Cie., GmbH, Dusseldorf, Germany
No Drawing. Continuation-in-part of application Ser. No. 587,402, Oct. 18, 1966. This application Sept. 30, 1969, Ser. No. 862,528
The portion of the term of the patent subsequent to Dec. 29, 1987, has been disclaimed
Int. Cl. A23l 1/00
U.S. Cl. 99—141                              9 Claims

ABSTRACT OF THE DISCLOSURE

Free-flowing powder containing powdered sugar which will not cake upon storage and a continuous process for the preparation of the said powder.

PRIOR APPLICATION

The present application is a continuation-in-part application of our copending, commonly assigned U.S. patent application Ser. No. 587,402, filed Oct. 18, 1966 now abandoned.

STATE OF THE ART

As is well known, powdered sugar has the tendency to cake together and can, consequently, only be packaged with difficulty in small amounts. The smallest package now on the market contains 250 gm. of powdered sugar. Even for these amounts, it is not possible to use ordinary pouring or distributing devices for the metering of the said sugar into packages, and these amounts can only be measured by pneumatically pressing the powdered sugar into the paper bags provided for this purpose. Therefore, until now it was impossible to bring powdered sugar on the market in packages containing only about 20 to 200 gm., which amounts are used for decorating or glazing home-baked cakes. Packages of this type contain either powdered sugar alone, or powdered sugar with dry culinary mixes in a combination package.

U.S. Pat. No. 2,772,171 discloses admixing powdered sugar for glazing use with shortening and other ingredients such as salt, cocoa and the like, to package the same in small amounts and to set it up together with a culinary dry mix in a combination package ready for sale. The individual components are admixed in a conventional mixer for the purpose of preparing this primarily prepared glaze mixture. While these mixing conditions suffice for the purpose intended, the continuous preparation of a free-flowing powder to be used for glazes from powdered sugar cannot be obtained in this manner, as numerous tests have proved.

U.S. Pat. No. 3,135,612 granted to Hair et al. is directed to agglomeration of flour containing food particles to provide a non-sticky, free-flowing culinary mix containing a large amount of flour and other ingredients. Preferably the mix contains 25 to 50% flour and 5 to 20% shortening, 30 to 50% sugar and small amounts of other ingredients. The shortening may be replaced by a highly concentrated aqueous sugar solution. The agglomerating liquid in any respect is admixed with flour containing powders by ordinary methods, preferably by spraying the powdery mix in a tumbling cylinder with an atomized spray of the agglomerating liquid. The starting materials of Hair et al. are completely different from the powdered sugar of the present invention and the method is completely different, and the results obtained when using method of the invention of spraying the freely falling powdered sugar and spraying the same powdered sugar using the Hair et al. method of rotating drum are different.

OBJECTS OF THE INVENTION

It is an object of the invention to provide a novel free-flowing powder for powdered sugar glazes, which can be measured in any amounts desired.

It is another object of the invention to provide a continuous process for the preparation of free-flowing powder for powdered sugar glazes.

These and other objects and advantages of the invention will become obvious from the following detailed description.

THE INVENTION

The novel process for the preparation of a free-flowing powder containing powdered sugar comprises subjecting a freshly sifted or strained powdered sugar to gravitational fall and spraying into the falling powdered sugar a finely divided melted shortening having a melting point of 30–35° C. so that the final product contains 5 to 40% by weight of shortening. As a modification of the process the powdered sugar may be subjected to a delayed gravitational fall.

As in similar processes for the preparation of dry culinary mixes, the shortenings have a melting point below normal body temperatures, preferably a melting point of between 30 and 35° C. and do not change in taste even after prolonged periods of storage. Examples of suitable shortenings are hydrogenated peanut oil, hydrogenated coconut oil, hydrogenated soybean oil, hydrogenated whale oil, mixtures of whale oil and palm oil, etc. Other fats or fat mixtures, natural or modified, according to known processes, which melt within the desired range, may be used. Hydrogenated peanut oil is a preferred shortening because of its stability over prolonged storage periods.

The amount of shortening required for obtaining the desired free-flowing effect is between 5 and 40% by weight of the composition. The amount of the shortening is generally determined on the basis of the final desired combination of the glazing powder, which can be admixed, depending upon the final usage, and the desired taste with other ingredients, such as cocoa or chocolate powder, mocha or milk powder, salt and/or flavoring agents. In most cases, a shortening content of about 15% by weight is preferred.

As already mentioned, powdered sugar tends to form agglomerates and therefore it is necessary to sift or strain the sugar such as through a shaking screen directly before, or at least shortly before it is subjected to the free or delayed gravitational fall. It is of particular advantage to adapt the shape and the density of the free or delayed falling powdered sugar jet to the shape of the spray jet of the concentrated shortening and this is easily obtained by using a shaking screen.

After the shortening has been sprayed on, subjecting the admixture to a subsequent treatment to obtain a still more homogeneous distribution of the shortening over the powdery ingredients has been found to be advantageous. For example, this after-treatment can be effected by rotating the admixture in a granulator or in any other revolving vessel. Particularly advantageous for this purpose is the utilization of a sloped and/or conical drum wherein the material is advanced while rotating. By changing the slope position or the divergent angle and the speed of rotation of the drum, the duration of the presence of the material in the drum and thereby the granulation process are controlled. In this manner, the structure of the product is changed from a flourly to a coarse, gritty form. It is also advantageous to continuously scrape off particles adhering to the inner wall of the drum with the aid of a brush when using this kind of drum.

An apparatus of simple construction usable for the spraying of the freely falling powdery ingredients and for after-treatment by rotation is described in commonly assigned, co-pending U.S. application Ser. No. 494,731 filed Oct. 11, 1965, now U.S. Pat. No. 3,551,166. This apparatus is also suitable for the continuous preparation of small amounts of powdered sugar glazes for testing purposes. The powdered ingredients are contained in a hopper and to keep the powder in a loosely packaged condition, air is advantageously blown into the bottom of the hopper by means of jets. The powder travels from the hopper through a metering screw and a vibrating trough into a funnel which imparts a convex shape to the free falling shower of powder. The freely falling shower of powder is thus adapted in shape and density to the spray of shortening and an optimum mixture of the components used is achieved. The shortening is sprayed into the falling shower of powder with the aid of an atomizing nozzle connected to a storage vessel through a metering pump. The said storage vessel is maintained at a temperature a few degrees above the melting temperatures of the shortening by means of a thermostat. The particles of the powder-shortening admixture fall into a conical rotating drum which is slowly rotated about its longitudinal axis by means of a motor, a belt and a shaft. The conical shape of the drum conforms to the angle of divergence of the spray of the shortening in such a way that none of the particles of shortening traveling at a substantial velocity will strike the wall of the drum.

When the shortening is sprayed into the freely falling shower of powdered ingredients, an envelope of the powdered mixture is formed around each shortening droplet. The particles of dry mix thus formed drop onto the wall of the drum due to their greater weight over a shorter flight path than any residual particles of dry powdered ingredients. Due to the rotation of the drum, the particles formed roll through the remaining dry powdered ingredients and bind these. Because of the crystallization of the shortening, which has began in the meantime, the particles congeal and roll over the edge of the rotating drum into a receiving vessel. Any particles adhering to the inner wall of the drum are continuously removed with the aid of the brush. In a larger version of the said apparatus, the mixture may be fed through a correspondingly larger vibrating screen instead of through a vibrating trough.

Other known devices which guarantee the spraying of the shortening in the powdered sugar may be used for the process of the invention. For example, long vertical cylindrical containers in which the powdered sugar in the free falling state, which advantageously is delayed by opposed currents of air, is sprayed with shortening, are also suitable for the preparation of the powder for powdered sugar glazes.

In the following example there is described a preferred embodiment of the invention to illustrate the invention. However, it should be understood that the invention is not intended to be limited to the specific embodiment.

EXAMPLE I

Preparation of a free-flowing powder for producing powdered sugar glazes

In a small apparatus as shown in FIG. 1 of co-pending application Ser. No. 494,731, 20 kg. per hour of freshly strained powdered sugar were fed from the supply hopper through the metering screw and vibrating trough into the feed funnel. While falling freely from the said funnel, the powdered sugar was sprayed with 3.5 kg. per hour of melted hydrogenated peanut oil having a melting point of 32°–34° C. and an iodine number of 70 from the atomized nozzle. The resulting mixture dropped into the conical rotation drum which was 120 cm. long and was rotated at 20 r.p.m. and had a divergent angle of 20°. The diameter of the drum was 40 cm. at its narrow end and 80 cm. at its wider end. The resultant particles were granulated while rolling over the inner wall of the drum, thereby forming uniformly large granules, which were collected in the receiving vessel.

The resultant floury-to-granular sugar product could be admixed even after being stored for 12 weeks, which means no agglomerates had been formed. When packaged in amounts of 10 gm., the product was very well suited for dusting cakes or pastry with sugar. For preparing glazes in the amounts ordinarily used by a housewife, 200 gm. amounts of the product were stirred with 25–35 cc. of hot milk or hot water in a simple procedure to form a consistent and spreadable glaze, which could be uniformly applied to cakes without forming lumps, and which congealed on the cakes giving them a smooth, glossy appearance.

Using the same procedure, the powdered sugar can be admixed with milk powder, coffee powder, cocoa powder, chocolate powder and other flavoring ingredients, to improve the taste of the glaze prior to the spraying with shortening. This admixture is then treated according to the process of the invention. In all cases, a glaze of excellent quality which does not take on a dull appearance even after standing several days, is obtained. Mixtures containing larger amounts of shortening can also be used as cake fillings and as a base for biscuit pastry.

Powders for powdered sugar glaze produced by the process of the invention will not change their consistency or lose their free-flowing characteristic even after a prolonged period of storage, regardless of the storage volume of the powder and the said powders exhibit a uniform structure. A particular advantage of the said powders is that they may be packaged in any desired small amounts without adverse effects and therefore they are useful for packaging with dry prepared culinary mixes in combination packages.

In order to compare the flow properties of untreated powdered sugar with the flow properties of the powders of the invention and the powders of U.S. Pat. No. 2,772,171, commercial packages were filled with 200 gm. of each type of powder and stored for one week. The packages were then placed in a shaking apparatus and subjected to three different vibrations to determine the amount of time required to completely empty the packages. The results are summarized in Table I which clearly shows the superiority of the flow properties of the product of the invention as compared to the prior art product and untreated powdered sugar.

TABLE I

| Product | Time in seconds at vibrations per minute | | |
|---|---|---|---|
| | 500 vibrations | 450 vibrations | 400 vibrations |
| Untreated powdered sugar | 52 | 53 | 49 |
| Sugar of U.S. Patent No. 2,772,171, containing 15% shortening | 17 | 19 | 20 |
| Product of invention containing 15% shortening | 11 | 12 | 15 |

EXAMPLE II

In a small apparatus as shown in FIG. 1 of co-pending application Ser. No. 494,731, 20 kg. per hour of freshly strained mixture of 16.75 kg. of powdered sugar and 3.25 kg. of cocoa powder were fed from the supply hopper through the metering screw and vibrating trough into the feed funnel. While falling freely from the said funnel, the powdered sugar mixture was sprayed with 5.0 kg. per hour of melted hydrogenated peanut oil having a melting point of 32°–34° C. and an iodine number of 70 from the atomized nozzle. The resulting mixture dropped into the conical rotation drum which was 120 cm. long and was rotated at 20 r.p.m. and had a divergent angle of 20° C. The diameter of the drum was 40 cm. at its narrow end and 80 cm. at its wider end. The resultant particles were granulated while rolling over the inner wall of the drum, thereby forming uniformly large granules, which were collected in the receiving vessel to form product A.

2 kg. of the same powdered mixture described above were sprayed over 90 minutes in a horizontally arranged rotating drum 25 cm. wide and 32 cm. long rotating at 40 rotations per minute with 0.5 kg. of the same melted fat described above in steps starting from the center of the drum using the same type of atomizing nozzle. During the spraying, egg-like agglomerates formed which required repeated stopping of the process to break up the egg-like agglomerates. The resulting product had a very varied granulate composition and was product B.

A sample of each of the dry mixes to be tested was filled into a funnel having an inlet diameter of about 8-10 cm. (the size of the funnel is immaterial) and was compressed so compactly that a cohesive cone was formed which did not fall apart when the funnel was inverted. This cone was placed on absorbent paper (filter paper) and was allowed to stand in this position at 25° C. The paper was impregnated with a fat-soluble dye, Sudan blue so that the fat ring became exceptionally clearly visible. Depending upon the type, amount and distribution of the shortening in the mix, a more or less large portion of the shortening migrates into the paper base and forms there a clearly visible ring around the cone. In comparative tests the size of this fat ring is a measure of the capability of the powder containing powdered sugar to preserve its free-flowing consistency during storage.

Product A did not show any signs of fat migration after 5 hours and after 3 days. Product B (U.S. Pat. 3,135,612) had a circular ring 2 mm. wide about the base of the cone after 5 hours and after 3 days, the ring about the base was 14 mm. This means that during storage, product B loses its free-flowing consistency and forms lumps due to fat migration while product A of the above-identified application will remain free-flowing even after prolonged storage.

Various modifications of the process and product of the invention may be made without departing from the spirit and scope thereof.

We claim:

1. A process for the preparation of a free-flowing powdered sugar consisting essentially of subjecting once a freshly sifted or strained powdered sugar to gravitational fall and spraying into the falling powdered sugar a finely divided melted shortening having a melting point of 30–35° C. so that the final powdered sugar contains 5 to 40% by weight of shortening.
2. The process of claim 1 wherein the shortening is hydrogenated peanut oil.
3. The process of claim 1 wherein the free-flowing powder containing powdered sugar is rotated in a granulator additionally to obtain a more granulated product.
4. The process of claim 1 wherein the powdered sugar contains powdered flavor ingredients.
5. The process of claim 1 wherein the amount of shortening is about 15% by weight of the final product.
6. The process of claim 1 wherein the shortening is atomized.
7. The process of claim 1 wherein a gas is passed counter-current to the falling powdered sugar to slow its rate of descent and keep it in the spraying-zone of the shortening until it is met by a shortening particle and falls down by its greater weight.
8. The product produced by the process of claim 1.
9. The process of claim 1 wherein the shape and density of the falling powdered sugar is adjusted to obtain maximum mixing with the sprayed shortening.

References Cited
UNITED STATES PATENTS

| | | | |
|---|---|---|---|
| 3,135,612 | 6/1964 | Hair | 99—94 |
| 3,143,428 | 8/1964 | Reimers et al. | 99—141 |
| 3,551,166 | 12/1970 | Baum et al. | 99—94 |

RAYMOND N. JONES, Primary Examiner

R. B. ANDEWELT, Assistant Examiner

U.S. Cl. X.R.

99—Agglom. Dig.